Sept. 1, 1936.  G. B. HARRISON  2,052,625
PRODUCTION OF COPIES FROM MULTICOLOR SCREEN CINEMATOGRAPH FILMS
Filed Feb. 23, 1935  2 Sheets-Sheet 1
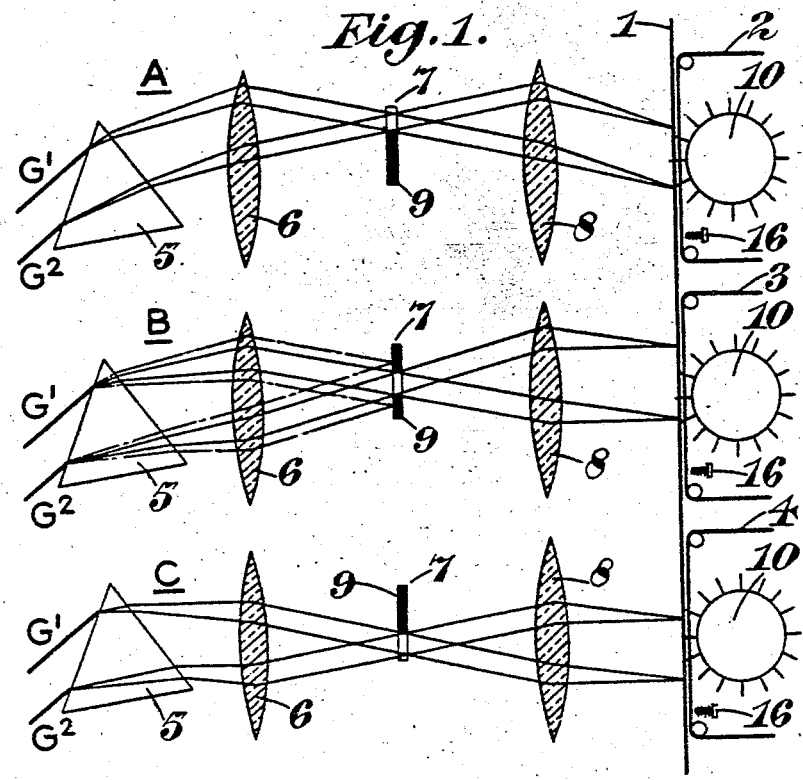
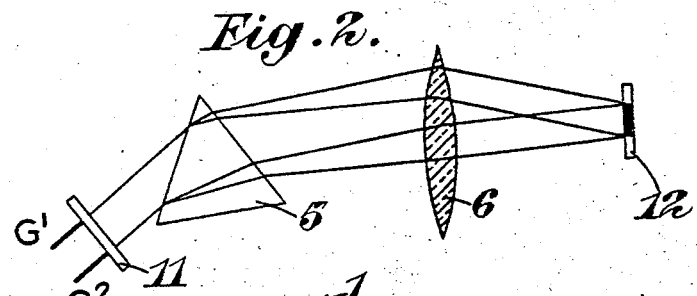
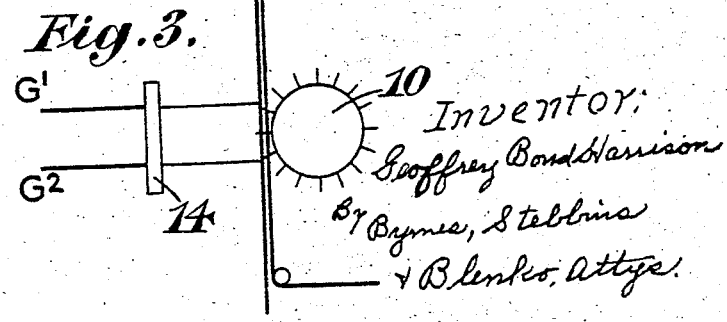
Inventor:
Geoffrey Bond Harrison
By Byrnes, Stebbins
& Blenko, Attys.

Sept. 1, 1936.    G. B. HARRISON    2,052,625
PRODUCTION OF COPIES FROM MULTICOLOR SCREEN CINEMATOGRAPH FILMS
Filed Feb. 23, 1935    2 Sheets-Sheet 2
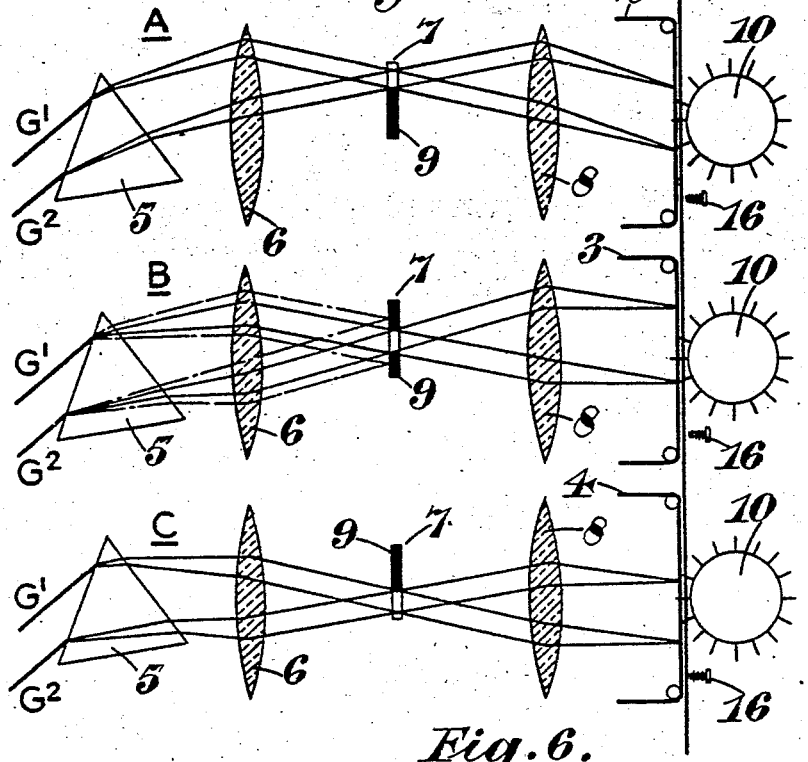
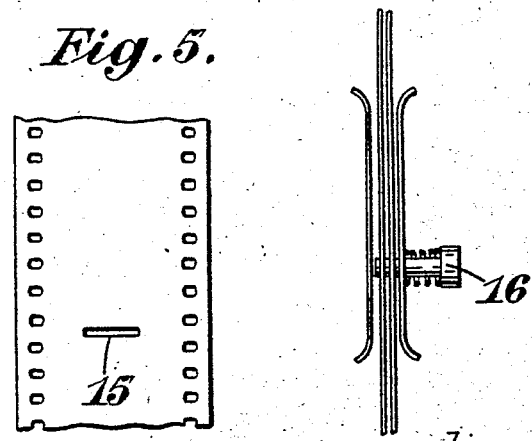
Inventor:
Geoffrey Bond Harrison,
By Byrnes, Stebbins & Blenko,
attys.

Patented Sept. 1, 1936

2,052,625

UNITED STATES PATENT OFFICE 2,052,625

PRODUCTION OF COPIES FROM MULTI-COLOR SCREEN CINEMATOGRAPH FILMS

Geoffrey Bond Harrison, Ilford, England, assignor to Ilford Limited, Ilford, England, a British company Application February 23, 1935, Serial No. 7,914
In Great Britain March 1, 1934

2 Claims. (Cl. 95—75)

This invention relates to a method for making a number of color copies either positive or negative, for a single master record in color associated with a multi-color screen, either positive or negative.

In commercial cinematography it is usual to make a large number of positive copies of the original or master negative film to be generally released for exhibition at various theatres and the like. Since the number of such copies usually required is exceedingly large and a master copy can only be used satisfactorily to make relatively few, say fifty copies, before mechanical damage due to repeated passage through the printing apparatus renders it useless for preparing further copies, it is usual to prepare a number, say twenty, intermediate copies from the master, which intermediate copies are then used in the preparation of the final published copy, say fifty from each, thus giving a thousand finished copies from a single master record without undue damage thereto.

In the application of this method to the printing of master colored records on multi-color screen material, the difficulty arises that if similar screen material is used for the copy materials, a certain amount of lack of definition and degradation of color will occur at the first stage of copying owing to the difficulty of securing accurate register of the master and copy screens, and at the second stage of printing from the intermediate copy to the final copy, a further lack of definition and degradation of colors will occur from the same cause, thus rendering the final copy very different from the original, and producing undesirable effects.

It is an object of the present invention to provide a method of producing large numbers of copies from a single multi-color screen cinematograph film in which the lack of definition and degradation of the colors in the copies caused by one of the printing steps described above is much reduced or eliminated.

The invention consists in the method of producing a large number of colored copies from a master positive or negative colored cinematograph film of the multi-color screen type which comprises the steps of preparing from the master film a plurality of sets of color separation prints each print of a set corresponding to one of the colors of the screen and each being on unscreened material and from each set preparing a plurality of finished copies by printing the several prints of the set in register on to color screen copying film using for each print light of color corresponding to the screen color to which the print is appropriate.

It will be seen that by the above method the detrimental effect of the color screen of the first copy in the known method described above is removed since the color separation prints have no associated color screen.

In carrying out this method the first color separation prints are prepared with the aid of narrow cut filters or by means of beams of light each of color corresponding to one of the colors of the master screen and from which the wave lengths transmitted by the other elements of the multi-color filter have been eliminated by a process similar to that described in my U. S. application Serial No. 718,450, filed March 31, 1934. Owing to the absence of a multi-color screen on the copy material the color separation prints will each be an accurate reproduction in monotone of one of the single color elements of the master film.

Some specific methods of carrying the invention into effect will now be described, by way of example, and with reference to the accompanying diagrammatic drawings in which:—

Figure 1 illustrates one method of producing sets of color separation prints,

Figure 2 illustrates a step in the formation of the mask for use in the method illustrated in Figure 1, Figure 3 illustrates an alternative method of producing sets of color separation prints.

Figure 4 illustrates one method of printing the final positive from the separation prints produced by the method illustrated in Figure 1, Figure 5 shows the registering perforation provided near the end of the base materials of each of the master and positive records and of the intermediate color separation prints, and Figure 6 illustrates the engagement of the registering perforations of two films by a registering device.

In each of the following examples a master positive in natural colors is prepared on three-color screen film (having red, green and blue-violet screen elements), preferably by taking a normal master negative and reversing this negative to give a positive record. This master positive is shown at 1 in Figures 1 and 3. From the master positive a plurality of sets of three intermediate part-color negative separation prints 2, 3 and 4, each corresponding to one of the colors of the master screen, are prepared by contact printing as shown in Figure 1 using for printing each print a beam of light of color corresponding to one color of the master screen and from which light of wave-lengths which would be transmitted by elements of the remaining two of the three colors has been eliminated. The method of producing light of this desired composition is shown in Figure 1. For each print a beam of parallel light G1 and G2 is analyzed into a pure spectrum by means of a prism 5 and lens 6. The different colors of the spectrum are brought to real foci at a plane 7 and the colors are directed through the master positive 1 on to the sensitive material for the intermediate negative, by a lens 8. Placed in the plane of the spectrum at 7 is a mask 9 which has opaque portions corresponding in position in the spectrum to the colors which it is desired to eliminate. Thus, in Figure 1A the lower portion of the mask 9 is opaque and serves to eliminate the greens and violets and to pass only those wave-lengths of red which would not be transmitted by the green and violet elements of the master screen. Similarly, in Figure 1B only the central portion of the mask is clear and the top and bottom portions serve to eliminate the green and violet wave-lengths as indicated. In Figure 1C only the bottom portion of the mask is clear and the red and green wave-lengths are eliminated.

In order to secure accurate registration of the images during the final printing step each of the intermediate negatives is accurately perforated and is fed by means of an accurately formed sprocket 10 which also engages with the master positive.

One method of producing the masks described above is to employ the arrangement shown in Figure 2 in which a beam of parallel light G1 and G2 is passed through a filter 11 having a color transmission similar to that of the elements of one color of the master positive and the light transmitted by this filter is analyzed into a spectrum by means of a prism and lens similar to those employed in the printing step, as described above. A color-sensitive photographic plate 12 is inserted in the plane of the spectrum and it will be seen that after exposure to this spectrum and development, the mask will bear an opaque band, corresponding in position in the spectrum to light passed by the elements of one color of the master screen. The process is repeated using a filter 11 corresponding to a different color of the master screen producing a second mask which may be combined with the first to provide a mask, which when employed in the manner shown in Figure 1, will allow to pass light of wave-lengths corresponding to one of the colors of the master screen, but will not allow to pass light of wave-lengths corresponding to either of the other colors of the screen or wave-length which are common to any two colors of the screen. Alternatively, instead of exposing two masks and combining them, a single mask may be produced by successively exposing a plate with different filters 11 in position and then developing the plate.

A number of sets of negative, part-color separation prints are prepared as described above from each master and for each positive the negatives from one set are successively printed in register onto positive three-color screen material 13 as shown in Figure 4. The light used for printing each of the negatives is similar to that used for the making of that negative, and is obtained in similar manner, as shown in Figure 4. To secure registration of the images of the intermediate negatives on the positive copy, the base materials of the negatives and copy are engaged by sprocket wheels in a manner similar to that used for printing the negatives.

It is not necessary in printing the negatives onto the final positive that the elements of the negatives (which correspond to the screen elements of the master), should be in register with the elements of the screen on the copy material. During the preparation of the final positive from the original master however, steps should be taken to diffuse the image slightly in order to compensate in some degree for the lack of exact registration between the elements of the original master screen as transferred to the intermediate negatives, and the elements of the final copy screen. This diffusion may be effected in any of the known ways and may take place either during the preparation of the intermediate records or during the preparation of the final copy or partly in both stages. In some cases and when suitable separation between the base materials is arranged sufficient diffusion may be provided by the fact that in the method described above the light of each color is not parallel at the printing gate.

An alternative way of producing the desired printing light is shown in Figure 3. In this case a sharp cut filter 14 is inserted in the path of a parallel beam of light G1 and G2 used for printing. The filter 14 has a transmission such that only light corresponding to one of the colors of the master screen is allowed to pass, and light which would be transmitted by any of the other screen elements is absorbed. In Figure 3 the printing of only one of the intermediate negatives is shown, but it is to be understood that the same arrangement is employed for each of the intermediate negatives, using appropriate filters. The printing of the final positive from the intermediate negatives is carried out in similar manner using the same or similar filters in each case.

In order to ensure that all the part-color intermediate negative images from each image frame of the master shall be printed on to the same image frame of the final positive copy, a registering perforation 15 is made near the beginning of the master, as shown in Figure 5, and similar perforations are made in each of the copies. Before commencement of printing either from the master on to an intermediate negative or from an intermediate negative on to a final positive, the registering perforations of each film are engaged by a spring pressed plunger 16 as shown in Figure 6 and the films are engaged by the driving sprocket wheel while their correct relative positions are thus determined. The plunger 16 is released from engagement with the films before feeding is commenced.

I claim:

1. The method of producing a large number of colored copies from a master positive or negative colored cinematograph film of the multi-color screen type which comprises the steps of preparing from the master film a plurality of sets of color separation prints each print of a set corresponding to one of the colors of the screen and each being on unscreened material, the light used for printing each print being of color corresponding to one of the colors of the master screen but having eliminated substantially all light of wave-lengths which would be transmitted by elements of the screen of different color and from each set preparing a plurality of finished copies by printing the several prints of the set in register on to color screen copying film using for each print light of color corresponding to the screen color to which the print is appropriate but having eliminated substantially all light of wave-lengths which would be transmitted by elements of the screen of different color.

2. The method of producing a large number of colored copies from a master positive or negative colored cinematograph film of the multi-color screen type which comprises the steps of preparing from the master film a plurality of sets of color separation prints each print of a set corresponding to one of the colors of the screen and each being on unscreened material, the light used for printing each print being of color corresponding to one of the colors of the master screen but having eliminated substantially all light of wave-lengths which would be transmitted by elements of the screen of different color, from each set preparing a plurality of finished copies by printing the several prints of the set in register on to color screen copying film using for each print light of color corresponding to the screen color to which the print is appropriate but having eliminated substantially all light of wave-lengths which would be transmitted by elements of the screen of different color and during one of the printing steps diffusing the image slightly.

GEOFFREY BOND HARRISON.